United States Patent [19]

Grossman et al.

[11] Patent Number: 4,596,681

[45] Date of Patent: Jun. 24, 1986

[54] METHOD OF FORMING CAPSULES CONTAINING A PRECISE AMOUNT OF MATERIAL

[75] Inventors: Mark W. Grossman, Framingham; William A. George, Rockport; Jakob Maya, Brookline, all of Mass.

[73] Assignee: GTE Products Corporation, Stamford, Conn.

[21] Appl. No.: 568,022

[22] Filed: Jan. 4, 1984

[51] Int. Cl.$^4$ ................ B29C 59/08; B29C 31/06
[52] U.S. Cl. ............................ 264/25; 65/34; 65/110; 65/DIG. 4; 264/80; 264/573; 264/297.9; 313/485; 313/565; 313/639; 445/9
[58] Field of Search ............... 264/167, 272.16, 80, 264/297.9, 524–525, 563, 573, 41, 15, 12, 51, 54, 150; 445/9; 313/484, 485, 639, 565; 65/34, 110, DIG. 4, DIG. 11

[56] References Cited

U.S. PATENT DOCUMENTS

| | | | |
|---|---|---|---|
| 700,805 | 5/1902 | Paine | 264/4 |
| 1,877,726 | 9/1932 | Noble | 445/9 |
| 2,491,874 | 12/1949 | Penon | 313/565 |
| 2,644,113 | 6/1953 | Etzkorn | 313/485 |
| 2,790,994 | 5/1957 | Cardot et al. | 264/525 |
| 2,892,956 | 6/1959 | Vodicka | 313/485 |
| 2,975,472 | 3/1961 | Colombo | 264/524 |
| 3,445,180 | 5/1969 | Lindh et al. | 264/525 |
| 3,542,618 | 11/1970 | De Vaughn | 264/150 |
| 3,895,709 | 7/1975 | Przybylek | 313/484 |
| 3,913,999 | 10/1975 | Clarke | 316/4 |
| 4,005,332 | 1/1977 | Gallo et al. | 313/485 |
| 4,303,432 | 12/1981 | Torobin | 264/12 |
| 4,379,252 | 4/1983 | Work et al. | 313/639 |
| 4,386,050 | 5/1983 | Anderson | 313/639 |

Primary Examiner—Jeffery Thurlow
Attorney, Agent, or Firm—William H. McNeill; Edward J. Coleman

[57] ABSTRACT

A method of forming a sealed capsule containing a submilligram quantity of mercury or the like, the capsule being constructed from a hollow glass tube, by placing a globule or droplet of the mercury in the tube. The tube is then evacuated and sealed and is subsequently heated so as to vaporize the mercury and fill the tube therewith. The tube is then separated into separate sealed capsules by heating spaced locations along the tube with a coiled heating wire means to cause collapse spaced locations therealong and thus enable separation of the tube into said capsules.

11 Claims, 7 Drawing Figures

Hg VAPOR PRESSURE AND MASS OF Hg PER CC AS A FUNCTION OF TEMPERATURE

METHOD OF FORMING CAPSULES CONTAINING A PRECISE AMOUNT OF MATERIAL

The Government has rights in this invention pursuant to Contract No. DE-AC03-76SF00098 awarded by the U.S. Department of Energy.

TECHNICAL FIELD

This invention relates devices into which material must be dispensed and more particularly to such devices which contain precise amounts of particular materials. Still more particularly the invention relates to methods for forming capsules which contain these precise amounts of materials.

BACKGROUND ART

Many devices require, for operation, that various amounts of vaporizable materials be included therein. Such devices include, but are not limited to, vacuum tubes, optical vapor filters and arc discharge lamps. Since this invention is well suited to discharge lamps it will be more fully explained in relation thereof.

Arc discharge lamps come in many varieties, such as fluorescent, mercury vapor, metal halide, sodium, etc. Virtually all of these lamps employ mercury as one of the vaporizable components. In current commercial lamps such, for example, as fluorescent lamps, it is common practice to mechanically dispense a drop of natural mercury into the lamp. In sodium lamps a drop of a sodium amalgam can be placed in the lamps.

This practice of mechanically dispersing mercury or other material works well because natural mercury is a fairly inexpensive commodity costing about $0.30/gram. It has also been suggested that the mercury droplet can be contained within a small capsule which is placed in the lamp and opened after the lamp is sealed. See U.S. Pat. No. 3,913,999.

Recently it has been determined that the efficiency of such lamps i.e., low pressure mercury-rare gas discharge lamps, can be enhanced if the isotopic mixture of the mercury is changed from that which occurs naturally. See, for example, Electric Discharge Lamps, MIT Press, 1971, by J. Waymouth for basic principles of low pressure mercury rare gas discharge lamps and U.S. Pat. No. 4,379,252. The latter patent teaches efficiency gains in fluorescent lamps when the $^{196}$Hg isotope is increased from its natural occurance of about 0.14% to about 3%.

The problem of employing such altered compounds of mercury lies in their expense. For example, at current prices, mercury which has been enhanced to contain 35% of the $^{196}$Hg isotope, costs about $500/milligram (mg). Accordingly, it can be seen that use of this material requires very strict controls on the amount employed. Further, such materials need only be used in sub-milligram amounts. The prior art does not provide methods for accurately dispensing nor controlling such precise amounts of material.

DISCLOSURE OF THE INVENTION

It is, therefore, an object of the invention to obviate the disadvantages of the prior art.

It is another object of the invention to enhance the dispensing of expensive materials.

Still another object of the invention is the provision of a method for accomplishing the control and containment of expensive materials.

These objects are accomplished, in one aspect of the invention, by a method of forming a sealed capsule containing a precise amount of a particular material by first providing an elongated tube sealed at one end. A globule of the particular material is placed in the tube at a position remote from the sealed end and the tube is evacuated from its open end. After evacuating, the open end of the tube is sealed and the globule of material is heated until it vaporizes and fills the tube. While the vaporized material fills the tube, the tube is separated into individual sealed capsules each containing a precise amount of the particular material.

BEST MODE FOR CARRYING OUT THE INVENTION

For a better understanding of the present invention together with other and further objects, advantages and capabilities thereof, reference is made to the following disclosure and appended claims in connection with the above described drawings.

Figure 1:
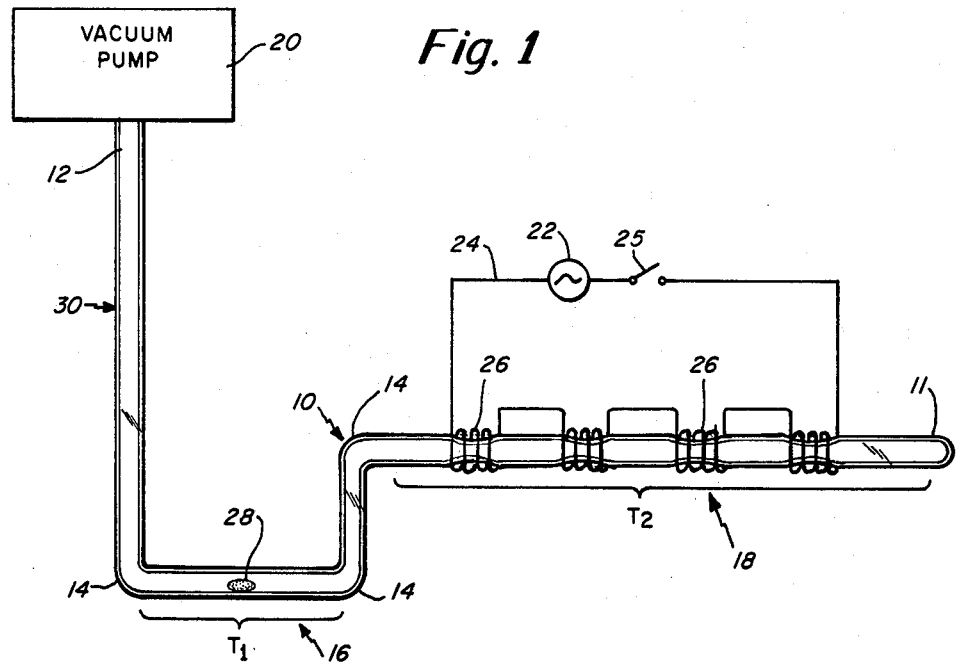
FIG. 1 illustrates a first embodiment for practicing the method of the present invention.

With reference to the drawings, FIG. 1 shows a glass tube 10 having a sealed end 11 and an open end 12. The tube 10 is provided with three right angle bends 14. The tube 10 may be considered as separated into a reservoir section 16 and a capsule (ampule) section 18. A vacuum pump 20 is connected to the open end 12 of the tube 10. An external heater wire circuit 22 is coupled to a heater wire 24 by way of switch 25. The heater wire 24 is formed into multiple space coil segments 26.

Prior to connection to the vacuum pump 20, a large drop or globule 28, of a precise material such as mercury having a high percentage of $^{196}$Hg isotope, is placed into the open end 12 of the glass tube 10 and disposed in the reservoir section 16 thereof. The open end 12 of the glass tube is then connected to the vacuum pump 20. Although not illustrated in FIG. 1, the vacuum pump 20 has associated therewith the required manifold, gages, etc. The vacuum pump 20 is operated to evacuate the tube with the exception of the mercury globule 28 that is maintained in the section 16 of the tube. The glass tube is then sealed off, such as at location 30 in FIG. 1 by melting an outside portion of the tube, such as with a torch, allowing the wall to collapse inwardly and thus sealing the tube 10 so that the tube 10 is then entirely sealed.

The next step is to apply heat to the glass tube 10 at the tube sections 16 and 18. The globule 28 and associated reservoir section 16 are heated to a temperature $T_1$. The ampule section 18 is maintained at a different temperature $T_2$, wherein temperature $T_1$ is less than temperature $T_2$. This temperature differential assures that the cold spot is in the reservoir section wherein is disposed the globule 28.

Figure 4:
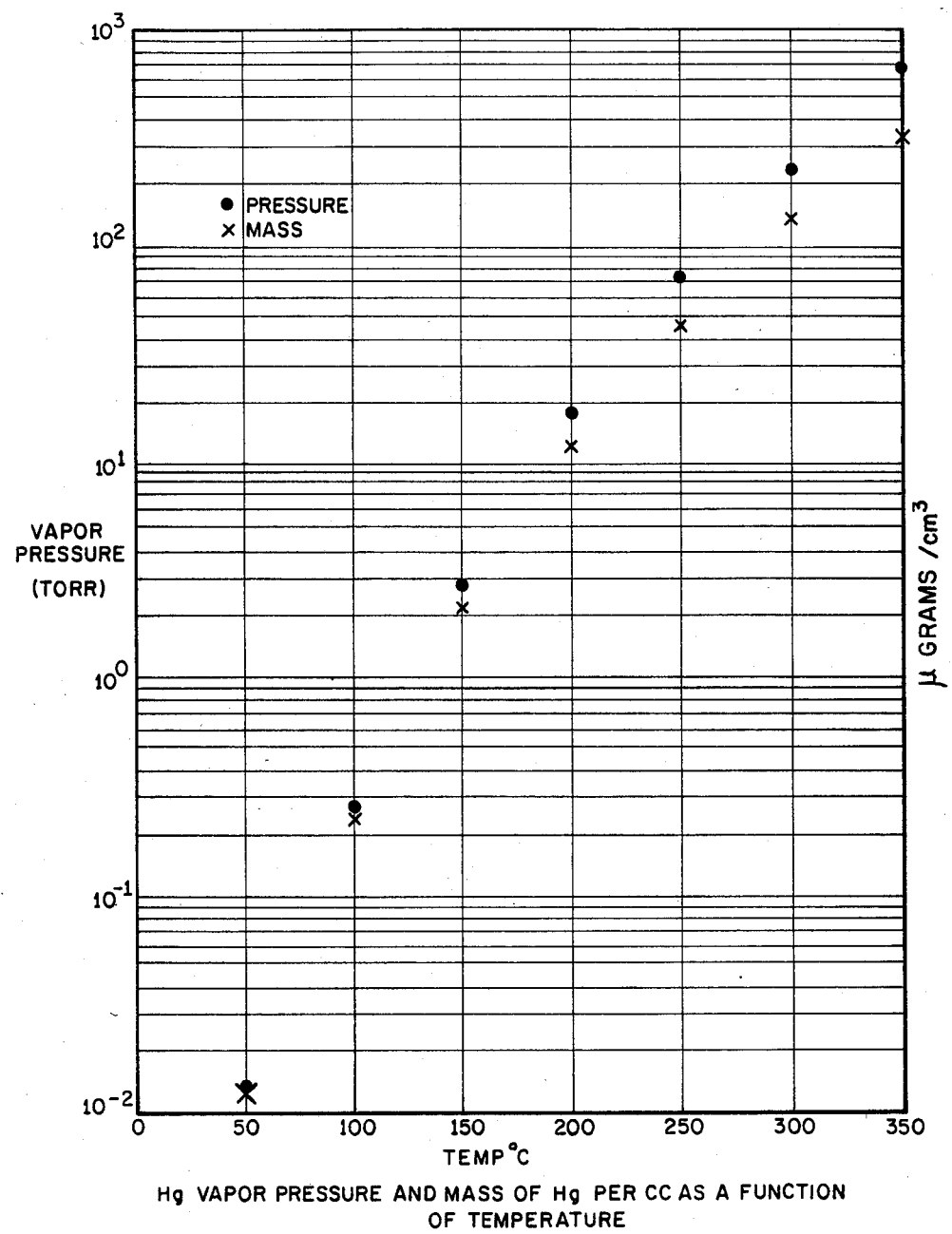
FIG. 4 is a plot of vapor pressure in Torr versus temperature in °C. relating to the method of the present invention.

As the heat applied to the tube is increased, the globule 28 is vaporized and fills the ampule section 18 with a high density of the vaporized material. For example, by referring to FIG. 4, showing values of mercury vapor pressure versus temperature, it will be seen that knowing the internal volume of section 18 in FIG. 1 allows one to accurately adjust the amount of mercury dispensed into the capsules by controlling $T_1$ and $T_2$. Specific examples are given hereinafter with regard to preferred operating parameters relating to, for example, tube dimensions, tube size, and temperature.

Once the ampule section 18 is filled with the material vapor, then the switch 25 is closed and the circuit 22 is connected to the heater wire 24. Electrical power is passed through the coil segments 26 causing tube collapse in the area of the segments 26 provided the proper power density, tube dimensions, and glass type are used. Also, in controlling this selective tube collapse, the internal material vapor pressure is to be controlled to be less than the ambient pressure in order for the tube to be capable of collapsing.

Figure 2:
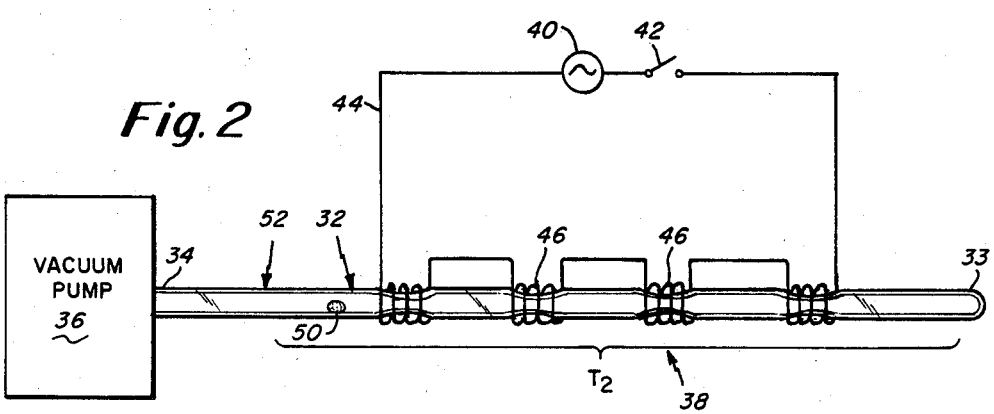
FIG. 2 illustrates a second embodiment for practicing the method of the present invention.

An alternate embodiment is shown in FIG. 2 wherein a glass tube 32 has a sealed end 33 and an open end 34. The open end 34 of the tube is shown coupled to a vacuum pump 36. The main ampule section 38 of the tube has associated therewith means for separating the section 38 into individual ampules. This means comprises an external heater wire circuit 40 connected in series with a switch 42 for making a series circuit with the heater wire 44. The heater wire 44 is defined in heater wire coil segments 46 and with each segment coiled about the tube 32, and with the segments being spaced from each other a distance comparable to the length of the capsule that is to be formed. In FIG. 2 four such segments are shown which in turn define four capsules. However, it is understood that the length of the tube 32 can be varied to provide for the forming of a lesser or greater number of ampules.

The method as practiced in accordance with FIG. 2 has many similarities to the method practiced in connection with FIG. 1. However, in the method of FIG. 2 instead of providing a relatively large drop of material, there is provided a premeasured amount of material 50 which is disposed in the tube 32 adjacent to the ampule section 38. The open end 34 of the tube is then connected to the vacuum pump 36 in order to evacuate the tube with the exception of the globule 50 which is maintained in the tube. The tube is then sealed off such as at 52 by melting an outside portion of the tube with a torch or the like, allowing the wall to collapse inwardly at that point. The sealed off section which contains the globule is then heated so that the globule is vaporized and fills the ampule section 38 with a high density of material. In practicing the method of FIG. 2, instead of having the two controlled temperatures used in association with the method of FIG. 1, the method is controlled using only a single uniform temperature $T_2$. This temperature is to be high enough so that all of the material is vaporized and is maintained at a temperature level whereby the ambient pressure is greater than the internal vapor pressure as described previously so that the tube is capable of collapse in the subsequent steps.

Thus, it will be seen that the embodiment of FIG. 1 operates in a saturated mode while the embodiment of FIG. 2 operates in an unsaturated mode.

Figure 3:
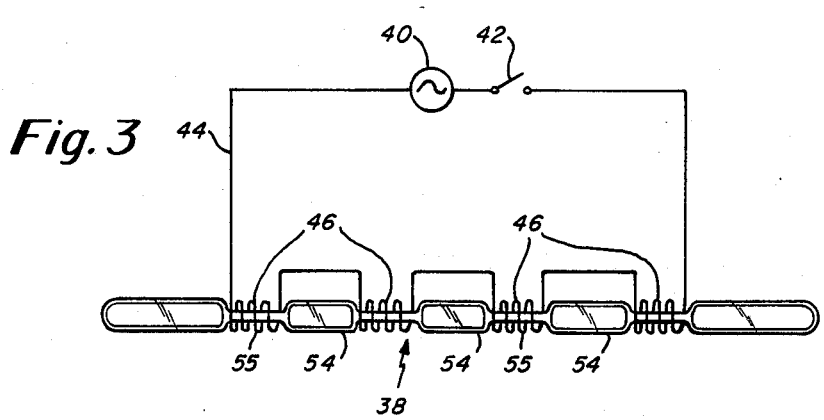
FIG. 3 illustrates one of the final steps in the method of the present invention applicable to either of the techniques of FIG. 1 or FIG. 2.

In the embodiment of FIG. 2, the operation of the external heater wire circuit 40 is the same as with the embodiment of FIG. 1; the purpose of the circuit being to cause selective heating at the coiled segments 46 so as to provide tube collapse, thus separating the tube into separate sealed capsules. In this regard, also refer to FIG. 3 which shows the appearance of the ampules 54 after sectioning in accordance with either of the methods of FIG. 1 or FIG. 2. The reference characters used in FIG. 3, however, correspond to those previously described in connection with FIG. 2. Note in FIG. 3 the glass bridge 55 formed by the heating step. This bridge is easily broken to separate the capsules.

Figure 5:
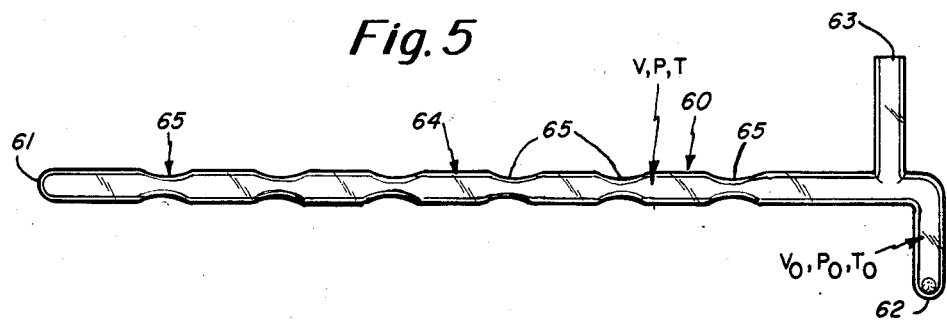
FIG. 5 shows a further embodiment of the initially formed glass tube.

FIG. 5 shows still another embodiment of the glass tube that may be used in practicing the method of the present invention. FIG. 5 illustrates the glass tube 60 having closed ends 61 and 62 and an open end 63 adapted at one point to be coupled to a vacuum pump. The elongated section 64 of the glass tube is demarcated by means of small annular indentations 65 spacedly disposed along the tube. The spacing of the indentations may be, for example, 12 mm. The tube illustrated in FIG. 5, as well as the tubes of FIGS. 1 and 2, are preferably constructed of infrared absorbing glass, such as Corning No. 9362. The open end 63 is adapted to receive a droplet of materials which is placed into the open end 63 and permitted to fall into the closed end 62 of the tube. After evacuation, the open end 63 is then sealed off such as in the manner previously described in conjunction with the method associated with FIGS. 1 and 2. The entire tube is then brought up to a predetermined temperature T. After waiting for temperature equilibrium and diffusion of the material, the indentations 65 are collapsed, thus isolating and separating each chamber for forming the ampules. Although not illustrated in FIG. 5, the wire heating circuit illustrated in FIGS, 1-3 may be used for providing tube collapse in forming the separate ampules.

The mass of material captured in each ampule may be predicted on the basis of the ideal gas law. In the following analysis, the ampule parameters are; V=ampule volume, P=material vapor pressure, and T=ampule temperature. Correspondingly, associated with the material reservoir, as illustrated in FIG. 5 at the closed end 62, the following parameters apply; $V_O$ =volume, $P_O$ =material pressure, and $T_O$ =temperature. In steady state, $P=P_O$ even if T does not equate to $T_O$. The above is true because the flux of material atoms is constant at any point within the connecting volume for steady state.

In connection with the determination of the mass of material captured, the following terms are now defined:

V=volume in which material is captured prior to sealing in cc.

p=Material pressure within the volume.

T=temperature of material in the volume.

k=Boltzmann constant=$1.38 \times 10^{-16}$ erg.

F=molecular weight of material, for example, Hg=200 gm/mole.

$N_o$ =Avogadro number=$6.02 \times 10^{23}$ atoms/mole.

m=mass of material in the volume.

n=density in atoms/cc.

In the following detailed discussion, the material is mercury.

Assuming a certain particle (mercury atom) density in volume, the mercury mass contained within the volume is given by:

$$M_{(gm)} = [(VnF)/N_O] \qquad (1)$$

where Vn=number of atoms in volume V and $F/N_O$ =mass/atom.

Assuming the ideal gas law for mercury vapor:

$$n = [P/(kT)] \qquad (2)$$

where p is the mercury pressure determined by the vapor pressure temperature relationship and T is the temperature of the mercury vapor in the volume V. It is noted that the temperature $T_O$, which does determine p, may or may not be equal to T, that is, the temperatures T and $T_O$ may be independent experimental variables.

Equations (1) and (2) above may be combined to give the following equation:

$$m_{(gm)} = [(VpF)/(TkN_O)] \qquad (3)$$

for m in grams, V in cm$^3$, p in Torr, and T in degrees Kelvin, equation (3) above may be stated as follows:

$$m = 3.17 \times 10^{-3} [(Vp)/T] \qquad (4)$$

Equation (4) describes the relationship by which a prediction of a mass of mercury formed in each ampule may be made. The first method described in conjunction with FIG. 1 represents a technique where a wide range of mass can be placed in each ampule without any premeasurement of mercury mass. However, knowledge of temperatures $T_1$ and $T_2$ is required as well as maintaining the temperature $T_2$ greater than the temperature $T_1$. This condition makes the first method more difficult to carry out in practice than the second method. The second method of the invention described in conjunction with FIG. 2 allows one to take a predetermined amount of mercury and divide it into small quantities without maintaining two temperature zones. This has the advantage of simpler temperature control but requires a premeasurement of the initial mercury quantity placed into the tube.

In the methods described in conjunction with FIGS. 1 and 2, the quantity of mercury deposited in each ampule is limited by the equation (4). In this connection, reference is now made to FIG. 4 which shows the relationship for mercury vapor pressure. and density (microgram/cm$^3$) as a function of temperature T, assuming $T_1 = T_2$. From FIG. 4 it is noted that the mercury density is limited by the maximum pressure attainable that still allows ampule sealing and separation and is limited by the maximum temperature that the ampule material and sealing mechanism can withstand.

Numerical values of mercury mass have been tabulated. In one example, a tube section with an inner diameter of 2.5 mm and an ampule length of 10 mm was used. In making measurements, the following additional parameters were also applied; $T = T_O = 350°$ C., V=0.490 cm$^3$, p=675 Torr, and m=1700 microgram.

With the above parameters, ampules have been formed with masses of mercury typically in the range of 0.1 to 0.2 mg per ampule in an ambient pressure of one atmosphere and mass density of about three mg per cm$^3$ using glass tubing. The tubing is preferably evacuated to a pressure equal to or less than $1 \times 10^{-3}$ torr.

In connection with the ampule section and sealing, it was found that a number of parameters effected operation. For example, such parameters as heater wire thickness, glass tube dimensions, glass tube geometry, and power density applied by the heater circuit to the tube, all effected the sectioning and sealing process. By controlling these parameters, reliable ampule formation has been obtained. Hereinafter is a further discussion of some of the above parameters as they effect the sectioning and sealing process.

In connection with the step of sealing and forming the capsules, a nichrome wire of 0.010 inch diameter (0.25 mm) has been used. To facilitate collapse, the wire coiling is preferably used in conjunction with a tube having indentations as illustrated in FIG. 5. The tube as indicated previously, is evacuated and then sealed. The nichrome wire may be provided with preferably four to six loops around each indentation. Next, a relatively substantial AC current of say four to five amps is passed through the wire to cause tube collapse.

Estimates can also be formed for predicting the time to reach a steady state with regard to generation of the mercury vapor. To obtain the maximum time of filling, one can use molecular flow approximation.

Figure 6:
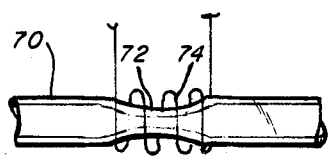
FIG. 6 is an enlarged fragmentary view of a section of the tube showing further detail of the tube indentation and associated wire heating coil.

FIG. 6 illustrates a section of a glass tube 70 with an indentation 72 and having a coil 74 with multiple turns wrapped about the indentation of the tube. There are four to six such coils illustrated in FIG. 6. These coils are spread through a length of approximately 0.15 inch, although the spread of the coils can be wider or narrower. Furthermore, the number of coils that are used can be more than or less than the four to six that are illustrated.

Figure 7:
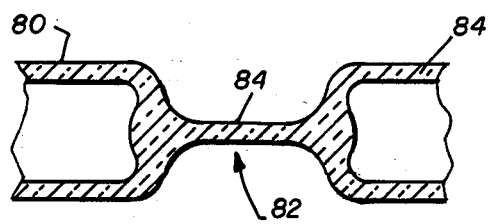
FIG. 7 is an enlarged cross-sectional view illustrating the manner in which the individual tube segments are formed into sealed capsules.

FIG. 7 illustrates the appearance of the tube after having been subjected to the heating by means of the multiple coil loop. FIG. 7 illustrates the tube 80 as shown collapsed at 82. This leaves a relatively thin glass bridge (see also FIG. 3) between the two sealed sections. If the heating action does not break this bridge, then it can be easily broken by hand so as to provide the final separation of the capsules.

In accordance with one example of the invention relating to the illustration of FIG. 2, it is noted that the mercury droplet size that is used is adapted to be controlled so that there will be complete vaporization when the equilibrium temperature is reached; that is, the vapor is unsaturated. In one example, seven separate ampule sections were used with an initial fill of 1.1 mg of mercury. The length of the tube was 4.43 inches with a volume of 0.552 cm$^3$. The inner radius of the tube was 0.125 cm. The critical temperature to vaporize 1.1 mg was calculated at 320° C., corresponding to p=376 torr as shown in FIG. 4. It is noted that even at 626° C., p is only 570 torr, indicating a permissable wide margin of temperatures.

It is noted that in the foregoing description, reference has been made throughout to the use of a mercury globule or droplet inserted into the glass tube for the purpose of creating mercury vapor. However, it is to be understood that the method described herein is applicable to other types of materials such as in conjunction with metal halide and high pressure mercury lamps where trace amounts of high vapor pressure materials may be added to the discharge. Thus, it is intended that the present invention not be limited to the use of mercury but instead be applicable to other constituents that may be used.

While there have been shown and described what are at present considered the preferred embodiments of the invention, it will be obvious to those skilled in the art that various changes and modifications may be made therein without departing from the scope of the invention as defined by the appended claims.

We claim:

1. A method of forming a sealed capsule containing a submilligram dosing of a particular material in the vapor phase, said capsule being formed from a vitreous material hollow tube means, comprising the steps of:

providing an elongated tubing means constructed at least in part of a vitreous material of which the capsule is to be made, said tubing means being sealed at one end, placing a globule of the particular material in the tubing means, evacuating the tubing means, except for said globule, sealing the tubing means after said evacuating step, heating the sealed tubing means at the position of the globule so as to vaporize at least some of the globule and fill the tubing means with said vaporized material at an internal vapor pressure maintained at less than ambient pressure, and separating the tubing means into separate sealed capsules by heating spaced locations along the tubing means to cause collapse and enable separation thereof.

2. A method as set forth in claim 1 wherein said globule comprises mercury.

3. A method as set forth in claim 1 wherein said globule is placed in a first section of the tubing means separate from a second section thereof that is to be separated into capsules.

4. A method as set forth in claim 3 wherein the second section of the tubing means is heated to a higher temperature than the first section thereof during the vaporization step.

5. A method as set forth in claim 4 wherein the sealing of the tubing means comprises flame sealing the tubing means.

6. A method as set forth in claim 1 wherein the step of heating to separate comprises wire coil heating.

7. A method as set forth in claim 1 wherein said globule is placed in a predetermined amount of said material.

8. A method of forming a sealed capsule adapted to contain a submilligram dosing of at least one constituent in the vapor phase, said capsule being formed from a vitreous material hollow tube means, comprising the steps of: evacuating and sealing the tube means, introducing the constituent in the vapor state into the tube means with the vapor pressure therein being maintained less than ambient pressure, and separating the tube means into separate sealed capsules by heating spaced sites along the tube means to cause collapse and enable separation thereof.

9. A method as set forth in claim 8 wherein said introducing of the constituent in the vapor state into the tube means comprises the steps of providing an elongated tube means, placing a globule of the constituent in the tube means, and heating the tube means after said evacuating and sealing.

10. A method as set forth in claim 9 wherein said globule is placed in a first section of the tube means separated from a second section thereof that is to be separated into capsules.

11. A method as set forth in claim 10 wherein the second section of the tube means is heated to a higher temperature than the first section thereof during the vaporization step.

* * * * *